(12) United States Patent
Biwersi et al.

(10) Patent No.: US 10,389,197 B2
(45) Date of Patent: Aug. 20, 2019

(54) LINEAR ELECTROMAGNETIC ACTUATOR COMPRISING TWO INDEPENDENT MOVING MEMBERS

(71) Applicant: MOVING MAGNET TECHNOLOGIES (MMT), Besançon (FR)

(72) Inventors: Stéphane Biwersi, Frambouhans (FR); Javier Rios-Quesada, Besançon (FR); Michaël Delbaere, Avanne-Aveney (FR); Guillaume Loussert, Besançon (FR); Gael Andrieux, Evilard (CH)

(73) Assignee: Moving Magnet Technologies (MMT), Besancon (FR)

( * ) Notice: Subject to any disclaimer, the term of this patent is extended or adjusted under 35 U.S.C. 154(b) by 214 days.

(21) Appl. No.: 15/115,008

(22) PCT Filed: Jan. 29, 2015

(86) PCT No.: PCT/FR2015/050207
§ 371 (c)(1),
(2) Date: Jul. 28, 2016

(87) PCT Pub. No.: WO2015/114261
PCT Pub. Date: Aug. 6, 2015

(65) Prior Publication Data
US 2016/0352168 A1    Dec. 1, 2016

(30) Foreign Application Priority Data

Jan. 29, 2014    (FR) ..................................... 14 50693

(51) Int. Cl.
*H02K 1/34* (2006.01)
*H02K 11/00* (2016.01)
(Continued)

(52) U.S. Cl.
CPC .............. *H02K 1/34* (2013.01); *H02K 11/215* (2016.01); *H02K 33/12* (2013.01); *H02K 33/16* (2013.01)

(58) Field of Classification Search
CPC ........ H02K 33/00; H02K 33/12; H02K 33/14; H02K 33/16; H01F 7/1615
(Continued)

(56) References Cited

U.S. PATENT DOCUMENTS

| 4,553,056 A | 11/1985 | Pfister |
| 4,985,652 A | 1/1991 | Oudet et al. |

(Continued)

FOREIGN PATENT DOCUMENTS

| DE | 102011009327 A1 * | 7/2012 | ........... H01F 7/1615 |
| EP | 2345800 A2 * | 7/2011 | ................ F01L 1/46 |

OTHER PUBLICATIONS

Meyer, Machine Translation of DE102011009327, Jul. 2012.*
(Continued)

*Primary Examiner* — Quyen P Leung
*Assistant Examiner* — Eric Johnson
(74) *Attorney, Agent, or Firm* — Harness, Dickey & Pierce, PLC

(57) ABSTRACT

A linear electromagnetic actuator includes a stator excited by at least one electric coil arranged around an axis of symmetry and two ferromagnetic stator poles positioned axially on either side of the coil, as well as at least two independent moving members, each of the moving members being formed of a ferromagnetic material, where the linear electromagnetic actuator includes at least three magnetized poles arranged inside the coil, with respectively a first magnetized pole positioned in the vicinity of the median plane separating the two moving members and containing the axis of the coil, and a second and third magnetized pole (Continued)

arranged laterally on either side of the moving members, between the moving members and the coil.

19 Claims, 9 Drawing Sheets

(51) Int. Cl.
  *H02K 33/12* (2006.01)
  *H02K 33/16* (2006.01)
  *H02K 11/215* (2016.01)
(58) Field of Classification Search
  USPC ........ 310/14, 15, 17, 23, 24, 28, 30, 36, 38; 417/418, 419
  See application file for complete search history.

(56) References Cited

U.S. PATENT DOCUMENTS

| | | | |
|---|---|---|---|
| 5,136,194 A | 8/1992 | Oudet et al. | |
| 5,434,549 A * | 7/1995 | Hirabayashi | H02K 33/00 335/229 |
| 5,444,313 A * | 8/1995 | Oudet | H02K 33/06 310/15 |
| 5,559,378 A | 9/1996 | Oudet et al. | |
| 6,098,288 A * | 8/2000 | Miyagawa | H02K 33/16 30/210 |
| 6,236,125 B1 | 5/2001 | Oudet et al. | |
| 6,736,614 B1 | 5/2004 | Bahnen et al. | |
| 7,589,445 B2 | 9/2009 | Gandel et al. | |
| 7,682,045 B2 | 3/2010 | Pfister | |
| 7,898,122 B2 | 3/2011 | Andrieux et al. | |
| 2005/0112001 A1 | 5/2005 | Bahnen et al. | |
| 2006/0049701 A1* | 3/2006 | Sato | F04B 35/04 310/14 |
| 2011/0109173 A1* | 5/2011 | Sugita | H02K 33/16 310/12.18 |
| 2013/0193780 A1 | 8/2013 | Takahashi et al. | |
| 2014/0150265 A1 | 6/2014 | Arlot et al. | |
| 2014/0203669 A1 | 7/2014 | Rios--Quesada et al. | |
| 2015/0048694 A1 | 2/2015 | Rios-Quesada et al. | |
| 2015/0333597 A1 | 11/2015 | Cremer et al. | |
| 2016/0164348 A1 | 6/2016 | Mellere | |

OTHER PUBLICATIONS

Sheidt et al., Machine Translation of EP2345800, Jul. 2011 (Year: 2011).*

Merriam-Websters, Pole Definition (Year: 2018).*

* cited by examiner

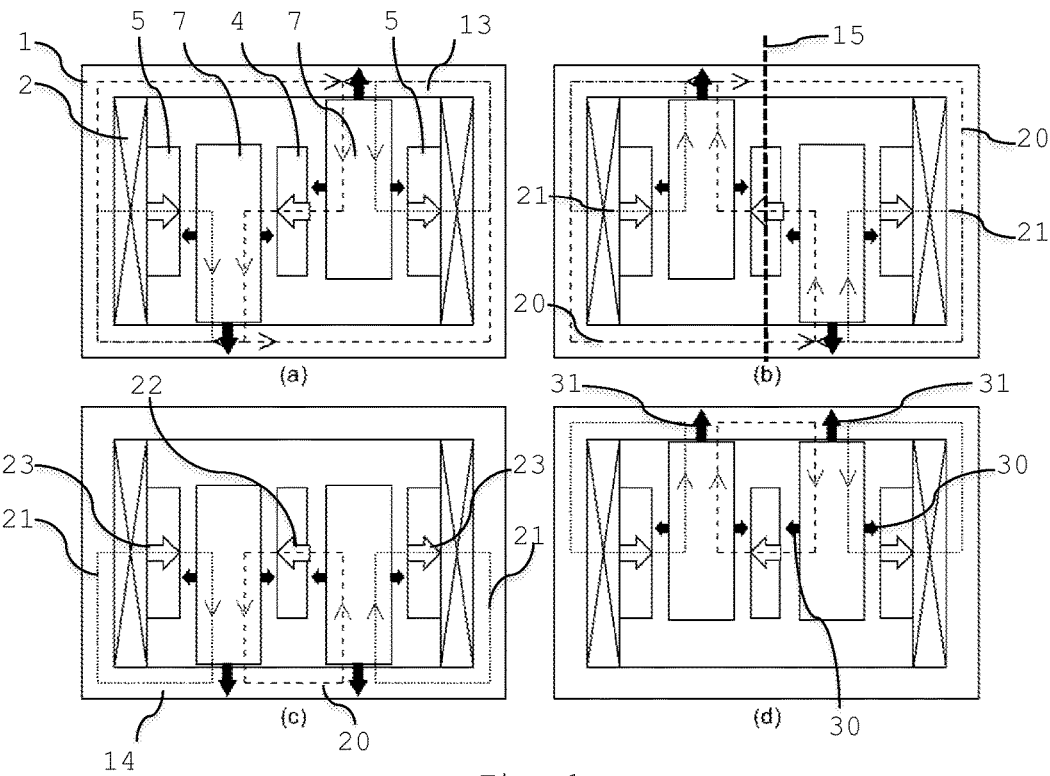
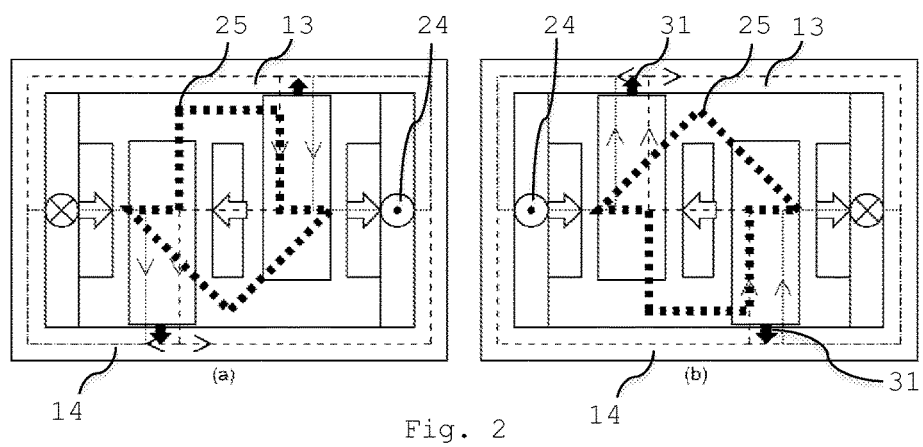
Fig. 1
Fig. 2

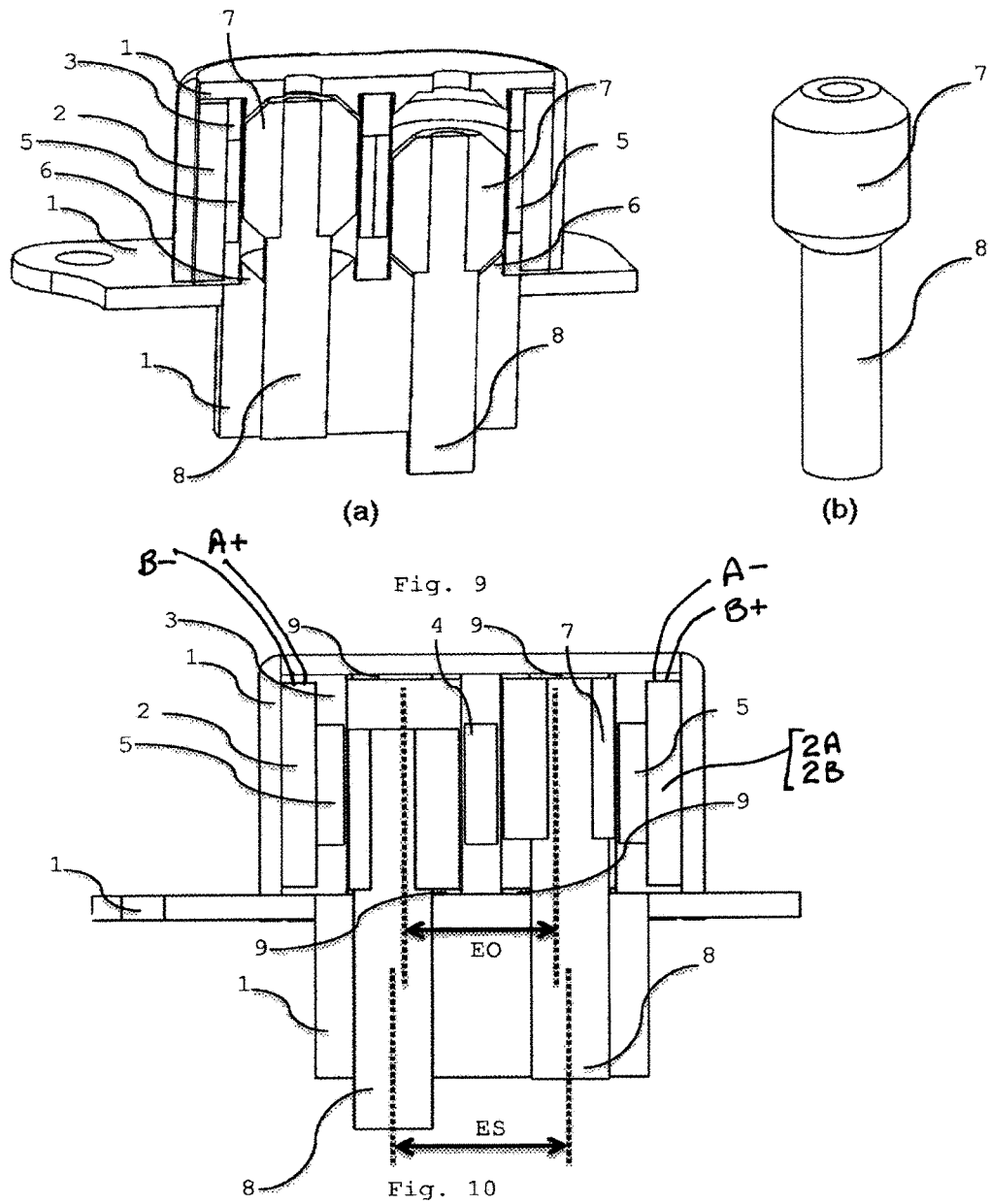

LINEAR ELECTROMAGNETIC ACTUATOR COMPRISING TWO INDEPENDENT MOVING MEMBERS

CROSS-REFERENCE TO RELATED APPLICATIONS

This application is a National Phase Entry of International Patent Application No. PCT/FR2015/050207, filed on Jan. 29, 2015, which claims priority to French Patent Application Serial No. 14/50693, filed on Jan. 29, 2014, both of which are incorporated by reference herein.

FIELD

The invention relates to the field of electromagnetic actuators comprising several mechanically independent members moving in a linear direction.

BACKGROUND

U.S. Pat. No. 6,098,288 relates to an electric razor comprising an electromagnetic linear actuator that moves the moving member in a coming and going movement and a second member of the blade type that interacts to cut the hairs. These moving members are magnetised. The European application EP2320543 is also known that describes an actuator comprising a set of permanent magnets magnetised in a direction that is perpendicular to the direction of movement of the movement system, such that the magnetic poles having different polarities alternate on the polar magnetic surfaces of the magnets in the direction of movement, a stator comprising the first and second magnetic poles on both sides of the row of permanent magnets, in a direction that is perpendicular and comprising each one of the magnetic poles facing the magnetic pole surface, a single phase coil exciting the parts of the magnetic poles forming the first and second units of magnetic polar parts.

The international application WO 2000063556 describes an oscillating piston drive, especially designed for an oscillating piston vacuum pump, comprising a housing (2) in which is located a cylinder (3), a piston (4) that can carry out a back and forth movement in the said cylinder, as well as an electromagnetic control component for the piston (4) and comprising an electromagnet (11) on the stator side and at least one permanent magnet on the piston side (18, 19). In order to improve the service life of this oscillating piston drive, permanent magnets (15, 16) are placed on the stator side, and the permanent magnet or magnets (18, 19) are designed and placed such that the piston (4) occupies a substantially central axial position, in the rest state.

U.S. Patent Publication No. 2013/193780 describes an actuator with a fixed part comprising a stator pole a coil fixed to the stator pole, a first moving member that comprises a first magnet magnetised in a direction from the inside towards the outside and placed to cover the external peripheral surface on an extremity in an axial direction from the fixed part, which is mounted elastically on the stator pole, and which is mobile in the axial direction. A second moving part comprises a second magnet that is magnetised in the direction from the interior to the exterior and placed to cover the outer periphery surface of the other end in the axial direction of the fixed part, which is mounted elastically on the stator pole, and which is mobile in the axial direction. When the current flows in the coil, the first moving section and the second moving section move in opposite directions. The coil axis is mounted in a horizontal direction.

The prior solutions have different disadvantages. Most of the proposed structures are mechanically and/or magnetically imbalanced giving rise to vibrations and sound pollution. Furthermore, the moving elements are, in the prior art solutions, combined with magnets that increase the weight and inertia and therefore deteriorate the performances of such actuators.

SUMMARY

Thus, the purpose of the invention is to propose an actuator that allows two independent movements while solving the problems experienced by the skilled person seeking to adapt the previous systems. Specifically, the main purpose of the invention is to propose an actuator allowing to balance the transverse forces that are applied to the moving elements, by the advantageous positioning of permanent magnets within the structure. By doing this, the previously identified overhang present in prior art actuators is significantly reduced or even compensated. The actuator can thus be most accurately sized to meet given specifications (for example to create an axial force to combat a load).

Another purpose of the invention is to create an actuator that provides the possibility of generating an antagonistic movement of the moving elements with a single electric control coil supplied in a double-polar manner or with two imbricated or concentric coils controlled in a single pole manner. This embodiment makes it possible to design a compact actuator, especially in the transverse direction to the movement. Another purpose of the invention is to allow the production of an oscillating actuator or a monostable actuator or a bistable actuator, i.e. having respectively no, one or two stable positions without any current at the extremities of the stroke for both independent moving members (the term "independent" means the absence of a mechanical connection between the two moving members).

More specifically, the invention concerns a linear electromagnetic actuator comprising a stator excited by at least one electric coil arranged around an axis of symmetry and two ferromagnetic stator poles positioned axially on either side of the coil, as well as at least two, independent moving members, each of the said moving members being formed of a ferromagnetic material, characterised in that the said linear electromagnetic actuator comprises at least three magnetised poles arranged inside the coil, with respectively a first magnetised pole positioned in the vicinity of the median plane separating the two moving members and containing the axis of the coil, and a second and third magnetised pole arranged laterally on either side of the said moving members and the coil. The term "magnetised pole" refers to a magnetic pole that is permanently magnetised in the absence of current.

Furthermore, the moving members are only made from soft ferromagnetic material and are separate from the magnetised poles, static in relation to the moving members. The moving members on the one hand, and the magnetised poles on the other, are separate elements, the magnets being fixed and static. Preferably, the moving members move in identical but opposing directions.

To this effect, the first, second and third magnetic poles are magnetised in a transverse direction, orthogonal to the coil axis and the second and third magnetised poles are magnetised in identical and opposing directions to the direction of magnetisation of the first magnetised pole. The second and third magnetised poles can be attached to each other or be separate parts. In a specific embodiment, the second and third magnetised poles are comprised of a single diametrically magnetised ring.

In a specific embodiment, the two stator poles have axially directed outcrops in the form of pole tips to favour an input of power at the start of the stroke. The actuator may comprise two electrically independent coaxial coils which can, furthermore, be imbricated in order to be able to use a single pole supply for each coil. Similarly; the electric coil can have an asymmetrical rotating geometry for the purposes of easier production and an optimisation of its shape factor. In another specific embodiment, the electric coil is borne by a body that has the properties of a permanent magnet and the second and third magnetised poles are comprised, at least partially, of the said magnetised body.

A position sensor indicating the position of at least one of the moving members can be used advantageously placed in a housing in the vicinity of the moving members. In order to optimise the mechanical interface with the external elements to be moved, the moving members are advantageously extended by exit shafts placed on the moving members. Different materials for the exit shaft and the moving member can also be used depending on the required mechanical output. Finally, one of the advantages of the invention and of the use of the exit shafts is the possibility of obtaining a spacing of the moving members that is different from the spacing of the output shafts.

BRIEF DESCRIPTION OF THE DRAWINGS

Other characteristics and advantages of the invention will become apparent upon reading the following description of particular embodiments of the invention that respectively represent.

FIG. 1: a first embodiment with the positioning of the magnets, the coils and the moving members as well as 4 stable actuator positions noted (a), (b), (c) and (d), in the absence of current in the coils, as well as the main flux paths for each magnet and the direction of the applied forces;

FIG. 2: the 2 stable positions in the presence of current in the first embodiment;

FIG. 9: a second alternative embodiment showing pole teeth and moving members with conical ends;

FIG. 10: an alternative embodiment with amagnetic blocks;

DETAILED DESCRIPTION

Figure 3:
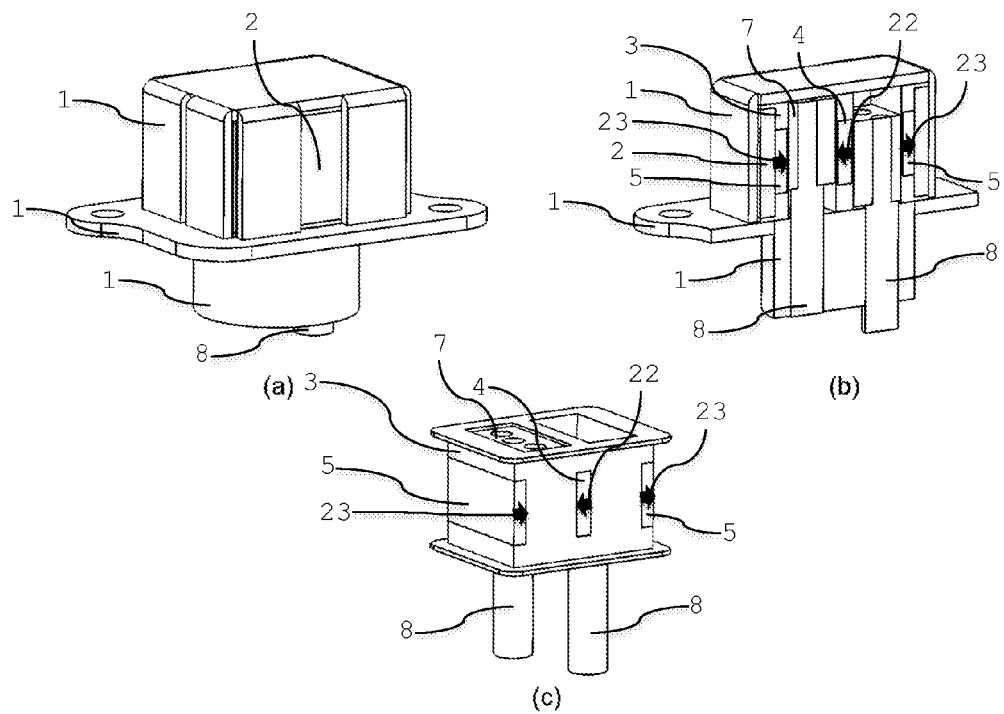
FIG. 3: a second embodiment with an actuator with three parallelepiped magnets and a rectangular coil.

FIGS. 1 and 2 schematically show a transverse cross section of the structure of an actuator according to the terms of the invention in a first embodiment. A set of ferromagnetic parts forms a ferromagnetic stator yoke (1) that contains an electric coil (2) surrounded by an axis (15) of symmetry. Inside this coil are placed two (soft) ferromagnetic moving members (7) independent of each other and three permanent magnets. The first magnetised pole (4) is positioned in the median plane separating the two moving members (7) and two other magnetised poles (4) on either side of the moving members (7). The magnetisation of the magnetised poles (4,5) is orthogonal to the coil axis (2), and the direction of the magnetisation (22) of the central magnetised pole (4) is opposed to the magnetisation direction (23) of the lateral magnets. On either side of the coil (2), axially, are located two stator poles (13, 14), in a soft ferromagnetic material. Each one of the stator poles (13, 14) participates in the different magnetic circuits defined on FIGS. 1 (*a*) to 1(*d*) to help loop the magnetic flux around the coil (2). In the example in FIGS. 1 and 2, the stator poles (13, 14) are in the form of straight or rectilinear poles, but they can be in the form of pole tips as shown in FIG. 9.

FIG. 1 shows the behaviour of the actuator in the absence of current with four stable positions, cases (a) and (b) showing the moving members (7) in stable positions on two opposite sides while cases (c) and (d) show the moving members (7) in stable positions on the same side, respectively bottom and top. It is to be noted that in the positions presented in FIG. 1.*c* and FIG. 1.*d*, the magnetic flux (20) of the central magnet and the magnetic flux (21) of the corresponding lateral magnet in a moving member have an opposing direction to that of the fluxes in the other moving member (7). In FIG. 1.*a* and FIG. 1.*b*, the direction of the magnetic flux (20) of the central magnet and the magnetic flux (21) of the corresponding lateral magnet have the same direction on both moving members (7). In all cases, the forces perpendicular (30) to the coil (2) axis tend to compensate each other, thereby limiting the overhang suffered by the moving members (7). The working force (31) produced by the actuator is therefore mainly oriented along the axis of movement of each of the moving members (7).

FIG. 2 shows the behaviour of the actuator in the presence of current. In this case, the electric coil (2) creates a magnetic field that imposes a direction (25) on the magnetic flux. The moving members (7) will place themselves so that the flux from the central magnet (20) and the flux from the lateral magnets (21), have the same direction in the moving members (7) as that of the flux due to the current (25).

Due to this, according to the terms of the invention, the actuator can operate in two different ways.

Without the contribution of an external force and supplied by alternating current, the moving members (7) oscillate between the positions in FIG. 2.*a* and that of FIG. 2.*b* in an alternating and antagonistic movement, each moving member (7) alternatively coming into contact with the stator pole (13) or the stator pole (14).

In the presence of an external force that can place the actuator in the positions in FIG. 1.*c* or FIG. 1.*d*, the actuator will be able to move, once the electric power supply is established, by moving a single moving member (7), either to the position in FIG. 2.*a*, or to the position in FIG. 2.*b* depending on the direction of the electric current (24) supplying the coil (2).

FIG. 3 shows an easy to produce embodiment. The coil body (3) has 3 notches to place the magnetised poles (5) and the magnetised pole (4) and 2 passages for the moving members (7). The upper stator cover (1) is made from folded sheet metal, and the magnetised pole (4) and the magnetised poles (5) are parallelepipeds magnetised according to their thickness. However, the magnetisation direction of the central magnet (22) is opposite to that of the other two magnets (23).

In this example of embodiment in FIG. 3, the exit of the movement outside the actuator is not achieved by the moving members (7) but via the exit shafts (8) attached to the moving members (7) by a choice of screwing, tapping, gluing or any other known technique allowing to attach two parts together. For example, a ball and socket type contact can also be envisaged to allow the rotation of the exit shaft (8) without the rotation of the moving member (7) and therefore allowing to withstand external torques that would apply to the exit shafts without damaging the moving members (7). The exit shafts (8) are preferably amagnetic or very slightly magnetic (relative permeability of a few units) in order to avoid magnetic leaks that are prejudicial to the forces created by the actuator.

Figure 4:
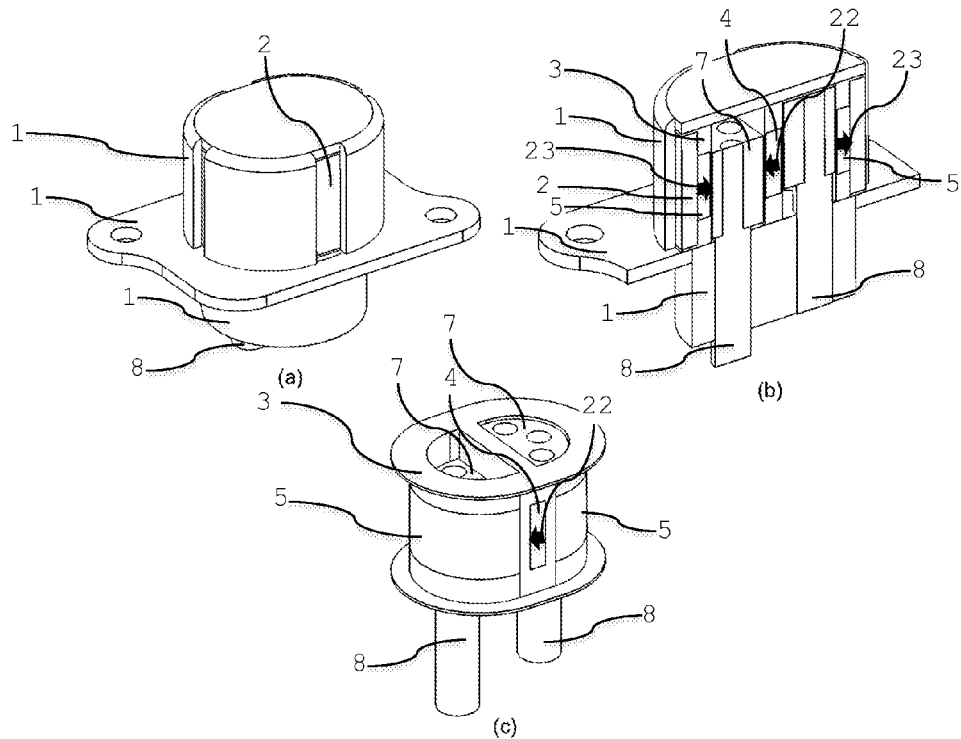
FIG. 4: a third embodiment with an actuator with lateral tile shaped magnets and an axisymetric coil.

FIG. 4 shows an embodiment of the actuator with an optimised coil (2) because it has a more favourable rounded form reducing the intrinsic resistance by a smaller wind length. This embodiment imposes the use of tile shaped magnetised poles (5). Their magnetisation (23) can be diametrical or radial.

Figure 5:
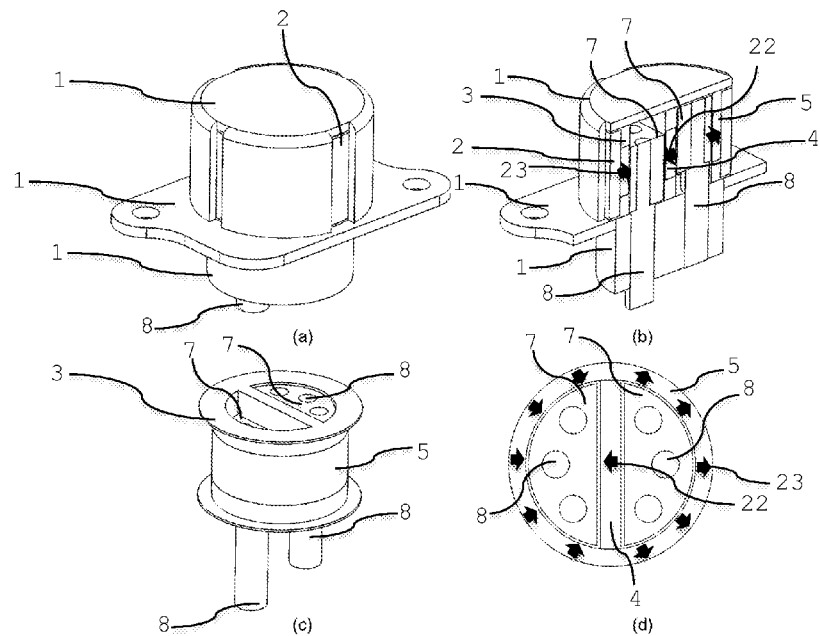
FIG. 5: a fourth embodiment with a cylindrical coil presenting an actuator where the lateral 2 magnets are replaced by a double-pole ring magnet.

FIG. 5 shows an embodiment of the actuator with a cylindrical coil (2) which makes it possible to obtain the lowest intrinsic resistance. This embodiment also makes it possible to more easily envisage the use of two coaxial electric coils that can be superimposed or imbricated ("twin-wire" coiling). The use of two coils will thus make it possible to use two single pole electricity supplies as opposed to the double-pole supply that would have to be used if a single coil was used. This embodiment uses a double-pole ring magnet (5) instead of the 2 lateral magnets. The second and third magnetised poles (5) of the invention are indeed magnetised parts that can be attached or separate depending on the selected embodiment. The magnetisation of the outer magnet (23) can be radial or diametric.

Figure 6:
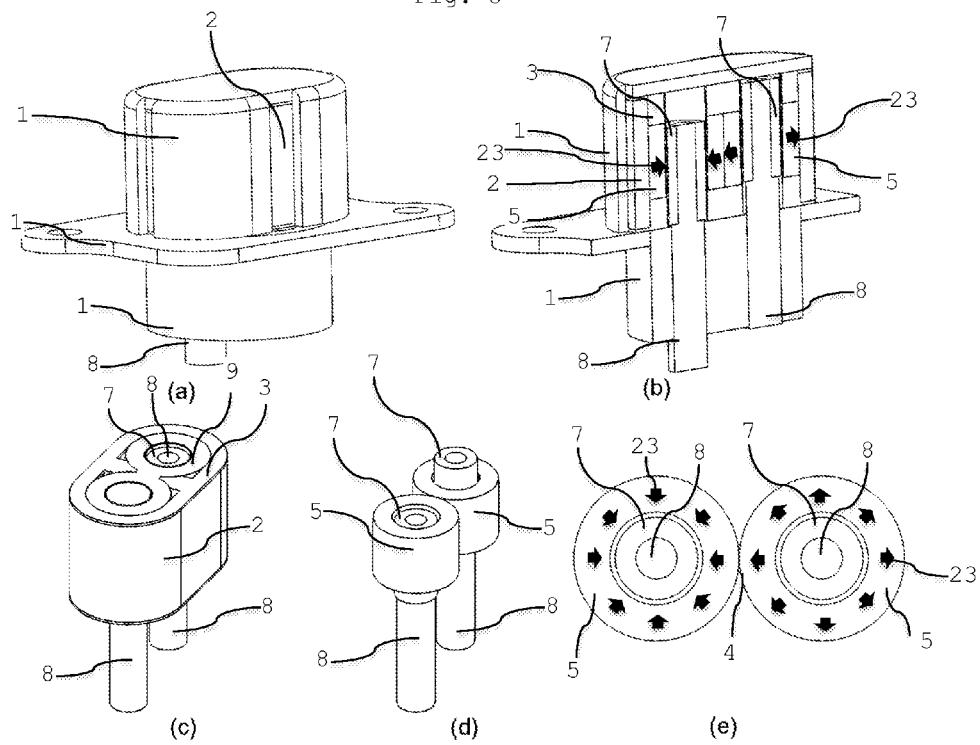
FIG. 6: a fifth embodiment presenting an actuator where the 3 magnets are recomposed using 2 radially magnetised cylindrical magnets.
Figure 7:
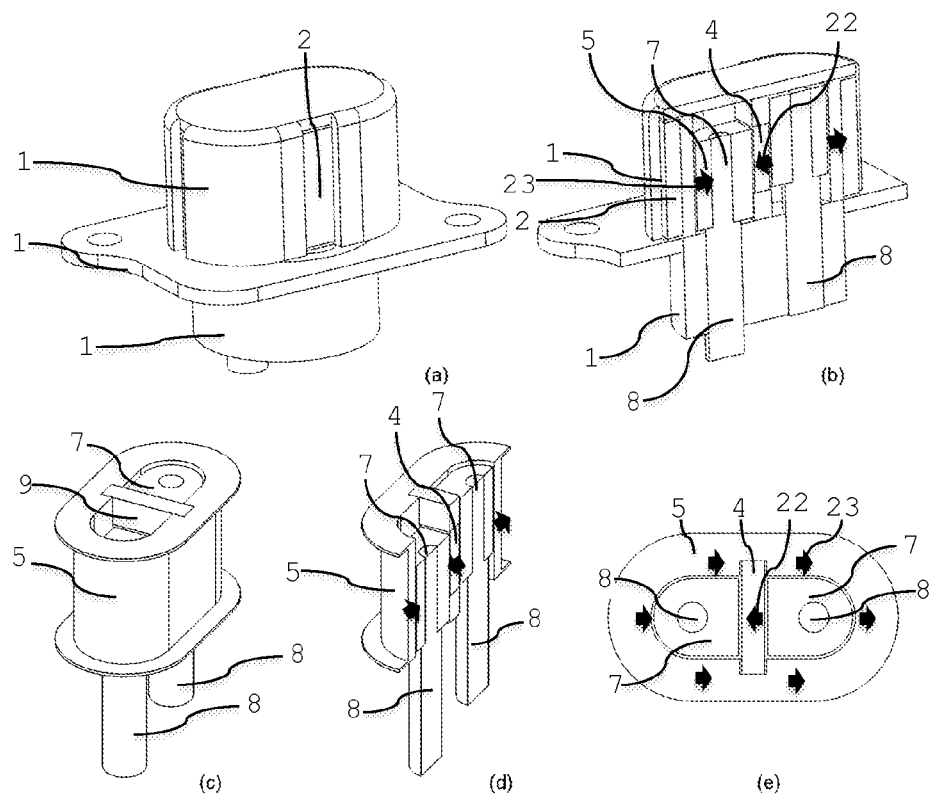
FIG. 7: a sixth embodiment with an actuator of the which coil body is made from a magnetisable material.

FIG. 6 shows a specific embodiment where 2 radially magnetised (23) ring magnets (5) are used, one on the inside and the other on the outside. By placing them against each other we obtain the same type of magnetisation as in the general case of an actuator with 3 flat magnets. This solution makes it possible to use moving members (7) of a cylindrical shape and makes the actuator insensitive to their rotation. In the example in FIG. 6, an amagnetic block (9) is used to hold the magnets.

Figure 14:
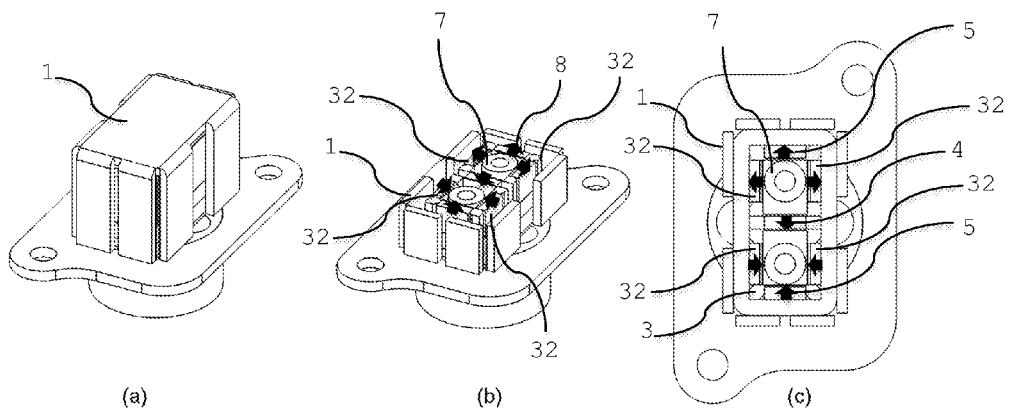
FIG. 14: an embodiment with parallelepiped magnets, having additional magnets.

FIG. 14 shows a specific embodiment where, using an embodiment with parallelepiped magnets for the central pole (4) and the lateral poles (5) and by adding four additional magnetised poles (32), the magnetic flux in the moving members is maximised while keeping a simple magnet shape. The figure shows an actuator with a coil body made from a magnetisable material used to replace the lateral magnets (5). In its centre is has a receptacle for the magnetised pole (4) that must be positioned at a height using blocks (9). In its most simple version, this magnet can be manufactured by injection (plastic binder magnet) and magnetised in a single pass.

Figure 8:
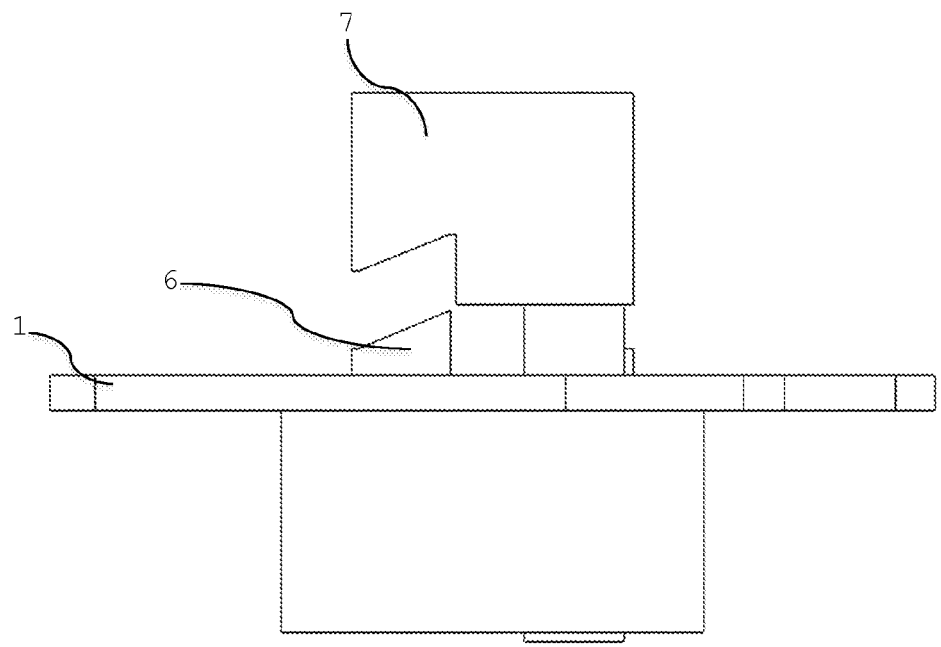
FIG. 8: an alternative embodiment presenting the side view of a stator with pole teeth.
Figure 15:
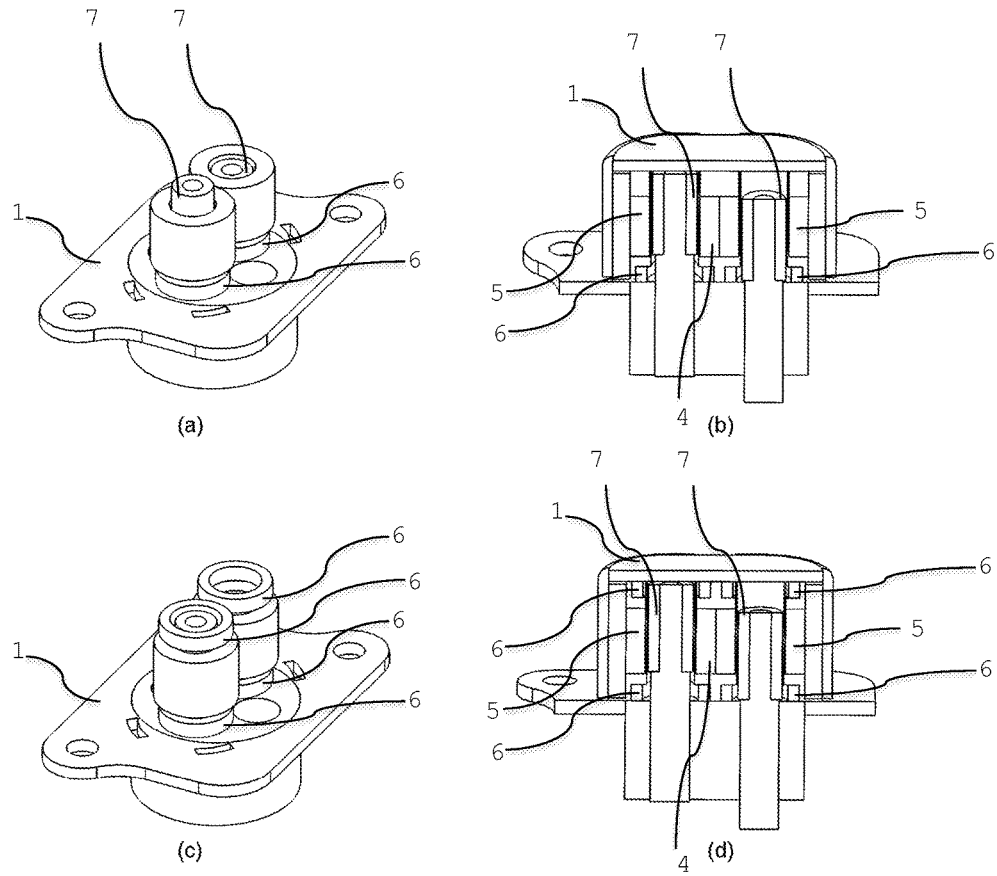
FIG. 15: two alternative embodiments with stators with polar teeth placed in the space between the magnets and the stator.

FIG. 8 and FIG. 15 show stator (1) embodiments with polar tips (6) used to strengthen the stable position exit force in one direction of movement. In the example in FIG. 8, the polar tip (6) is attached to the stator (1) and is located below the moving member (7). When the moving member (7) opposite it is in the high position, the proximity of the polar tip (6) makes it possible to generate a calling force by the effect of a favourable variable reluctance and eventually allows movement even in critical cases (critical temperatures, abnormal friction).

In the examples in FIG. 15, the stator polar tips (6) placed in the space between the magnets (4) and (5) and the stator (1) are used, allowing to have a simple shape for the moving member (7). FIGS. 15.*a* and 15.*b* show the case of polar tips (14) placed on only one side of the actuator making it possible to have a calling force in one direction of the movement. FIGS. 15.*c* and 15.*d* show the case of polar tips (14) placed on both sides of the stator (1) to obtain a calling force in both directions of the movement.

FIG. 9 shows an embodiment of the stator (1) with polar tips (6) on the stator (1) on either side of the moving members (7). The moving members (7) are of a conical shape that is complementary to the stator (7) shape, allowing to increase the produced magnetic force. This is an actuator based on the embodiment shown in FIG. 6 with the advantages of the presence of polar tips explained previously.

Figure 16:
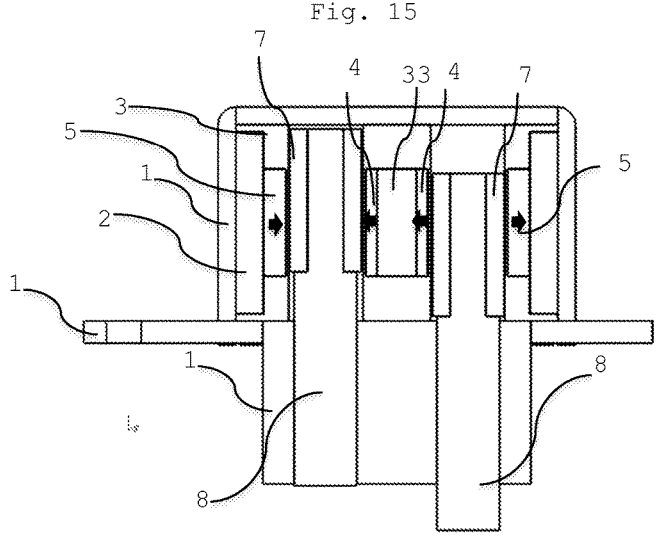
FIG. 16: an alternative embodiment in which the central magnetised pole is formed by two magnets on either side of a ferromagnetic part making it possible to drive the flux.

FIG. 16 shows an embodiment of the central magnetised pole by the superimposition of two magnets (4) and a ferromagnetic part (33) allowing the passage of the flux. This structure makes it possible to reduce the size of the central magnet when the actuator spacing is large and to reduce the weight of the moving members (7).

Figure 17:
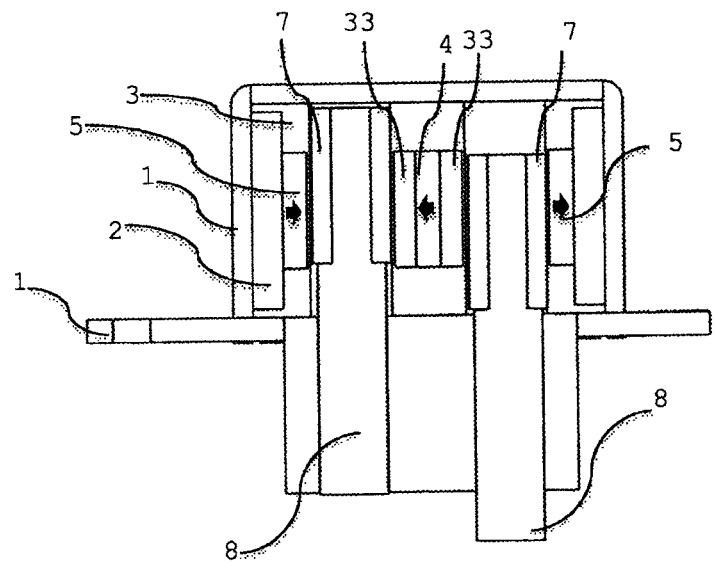
FIG. 17: an alternative embodiment in which the central magnet comprises polar parts
Figure 18:
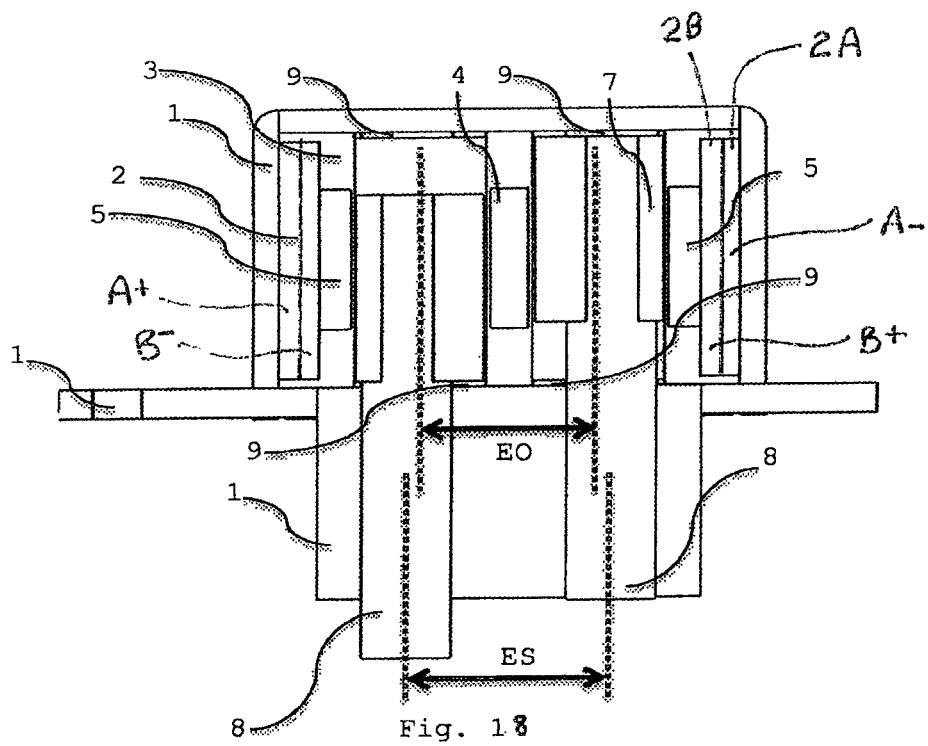
FIG. 18: the embodiment of FIG. 10 with two coaxial and independent coils 2A and 2B.

FIG. 17 shows an embodiment similar to that in FIG. 16, with a single central magnet (4) and two ferromagnetic polar parts (33) on either side. The purpose of this structure is to reduce the moving weight and to balance the weight of the moving members (7) around the exit axis (8).

FIG. 10 shows an embodiment of the actuator with a possible stroke longer than the sought after working stroke. The presence of amagnetic blocks (9) indeed allows to reduce the possible stoke to the working stroke without altering the actuator. An actuator according to the terms of the invention can, depending on the sizing, have a holding force (called "sticking") between the moving member (7) and the stator (1) that is too strong, limiting the possibility of leaving this position with a low electric power. The use of blocks thereby makes it possible to modulate the required sticking force and thus increase the level of the force with current when the moving members (7) leave the stable position (called "unsticking"). The moving member (7) on the right in FIG. 10 is in the sticking position against the amagnetic block (9).

The embodiment of this FIG. 10 also makes it possible to appreciate the interest of presenting the exit shafts (8) that are carried over onto the moving members (7). Besides the effects already described concerning FIG. 3, these exit shafts make it possible to generate two exits of which the space ES is different from the space EO of the moving members (7) within the actuator. On the example in FIG. 10, the ES space between the exit shafts (8) is thus bigger than the space EO between the moving members (7). The fact that these exit shafts (8) are carried over also makes it possible to make the creation of different alternatives highly flexible, which would be differentiated by the different ES spacings but also by different exit shaft (8) diameters.

Figure 11:
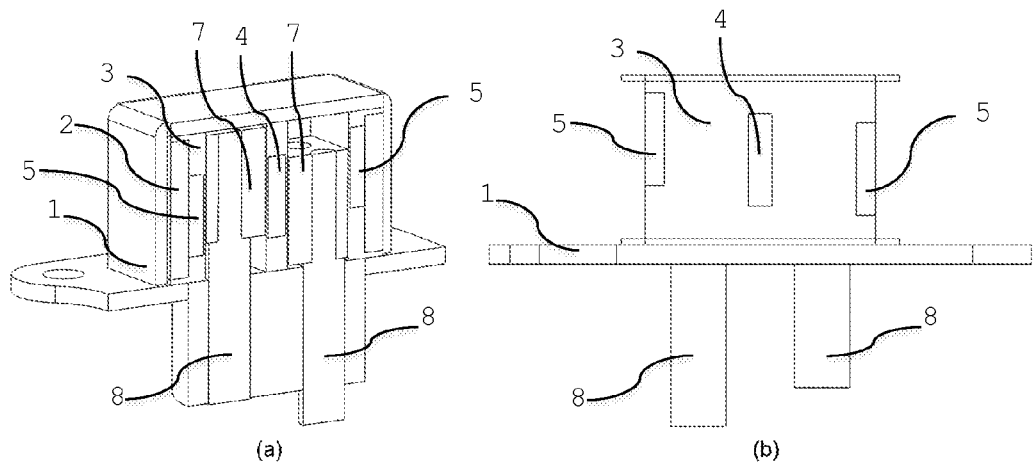
FIG. 11: an embodiment allowing the asymmetry of the force in the actuator current.

FIG. 11 shows an embodiment that makes it possible to obtain different forces without current for each moving member by using the relative position of the lateral magnetised poles (5) between each other and relative to the stator (1). The case shown in FIG. 11 makes it possible to obtain a higher sticking force on one side than on the other for a given moving member (7) and in the opposite direction to that of the other moving member (7) by approaching, and respectively distancing, the magnets from the end positions. Embodiments making it possible to increase the force on a single side of the actuator for both moving members (7) can be created by varying the position of the inner magnetised pole (4).

Figure 12:
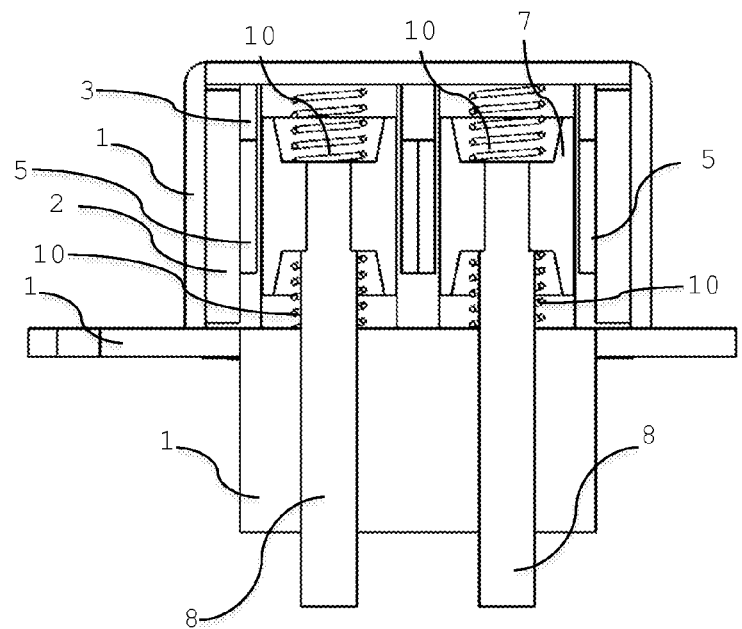
FIG. 12: an embodiment of a vibrating actuator with a double antagonistic output.

FIG. 12 shows an embodiment where the moving members (7) are suspended using springs (10). This makes it possible to obtain two types of actuator depending on the selected spring stiffness (10). Either the stiffness is high and the force of the actuator with current does not make it possible to maintain the sticking on the stator (1) poles, in this case a vibrating actuator with a simple double antagonistic exit is obtained. Or the stiffness is not sufficiently high to prevent the sticking on the stator (1) poles and an actuator with 3 stable states is obtained for each moving member (7): 2 with the magnetic sticking on either side of the stroke, and 1 in the central position by the elastic force of the springs (10).

Figure 13:
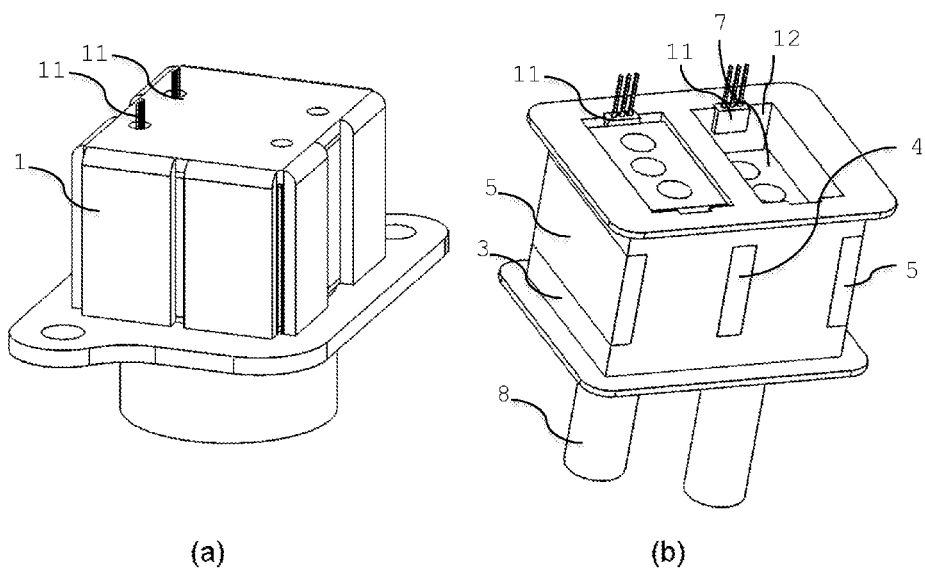
FIG. 13: an embodiment including a sensor making it possible to determine the position of the moving members.

FIG. 13 shows an embodiment that includes a position sensor (11) making it possible to determine the position of each moving member (7) as soon as power is applied. In this embodiment, the sensor (11) takes the form of two magnetically sensitive sensors that are placed on the upper part of the actuator in the vicinity of the moving members (7) in a free housing (12), here lateral, generated between the coil body (3) and the moving members (7). These magnetically sensitive sensors can be of the digital type, i.e. of the "on-off" type differentiating the upper and lower position of the moving members (7), or of the analogue type, i.e. determining the position of the moving members (7) along their entire stroke.

In the example on FIG. 13, two magnetically sensitive sensors are used, the purpose of which is to differentiate the position of each moving member (7). It can be envisaged to only use one magnetically sensitive sensor covering only one moving member (7). Similarly, in the example in FIG. 13, both sensors are different and independent elements. The use of the presented magnetically sensitive sensors can be envisaged in a single common box, or to use a single sensor with several independent axes of sensitivity.

The invention claimed is:

1. A linear electromagnetic actuator comprising:
   a stator excited by at least one electric coil arranged around an axis of symmetry;
   two ferromagnetic stator poles positioned axially on either side of the coil;
   at least two independent moving members which are moveable in longitudinal directions, each of the moving members being formed of a ferromagnetic material;
   at least three magnetized poles arranged inside the coil, with respectively a first magnetized pole positioned in a vicinity of the median plane separating the two moving members and containing the axis of the coil, and a second and third magnetized pole arranged laterally on either side of the moving members, between the moving members and the coil, the longitudinal and lateral directions being perpendicular to each other; and
   the magnetized poles being permanently magnetized in the absence of current.

2. The linear electromagnetic actuator according to claim 1 wherein: the moving members move in identical but opposite directions along the longitudinal direction; each of the moving members includes a cylindrical outer shape; and all of the magnetized poles are laterally internal to the at least one electrical coil and are longitudinally inwardly spaced from the stator poles.

3. The linear electromagnetic actuator according to claim 1 wherein the first, second and third magnetised poles are magnetised in a transverse direction, orthogonal to the coil axis.

4. The linear electromagnetic actuator according to claim 3 wherein the second and third magnetised poles are magnetised in identical directions opposed the magnetisation direction of the first magnetised pole.

5. The linear electromagnetic actuator according to claim 1 wherein the second and third magnetised poles are attached.

6. The linear electromagnetic actuator according to claim 1 wherein both of the stator poles include axially directed outcrops to act as polar tips.

7. The linear electromagnetic actuator according to claim 1, wherein the electric coil is borne by a magnetised body that has the properties of a permanent magnet and the second and third magnetised poles are comprised, at least partially, of the magnetised body.

8. The linear electromagnetic actuator according to claim 1, wherein the electric coil has an asymmetric rotating geometry.

9. The linear electromagnetic actuator according to claim 1, wherein the second and third magnetised poles are comprised of a single diametrically magnetised ring.

10. The linear electromagnetic actuator according to claim 1, further comprising a position sensor indicating the position of at least one of the moving members.

11. The linear electromagnetic actuator according to claim 10 wherein the position sensor is placed in a housing in a vicinity of the moving members.

12. The linear electromagnetic actuator according to claim 1 wherein the moving members are extended by exit shafts attached to the moving members, and the exit shafts are amagnetic.

13. The linear electromagnetic actuator according to claim 12 wherein the moving members and the exit shafts are made of different materials.

14. The linear electromagnetic actuator according to claim 12 wherein a spacing of the moving members and a spacing of the exit shafts are different.

15. A linear electromagnetic actuator comprising: a stator energizable by multiple unipolar electric coils arranged around an axis of symmetry; multiple stator poles positioned axially on either side of the coils; multiple and antagonistically moveable members of ferromagnetic material; at least three permanently magnetized poles located inside the coil with two of the magnetized poles each arranged laterally on either side of the movable members between the moveable members and the coils; the movable members being moveable relative to the poles which are static; and all of the magnetized poles being axially spaced away from the stator poles.

16. The linear electromagnetic actuator according to claim 15, wherein the electric coil has an asymmetric rotating geometry.

17. The linear electromagnetic actuator according to claim 15, wherein the second and third magnetised poles are comprised of a single diametrically magnetised ring, and the moveable members are mechanically independent of each other.

18. The linear electromagnetic actuator according to claim 15 further comprising: a position sensor located in a housing in a vicinity of the movable members operably indicating a position of at least one of the movable members; each of the moveable members including a cylindrical outer shape; and the magnetized poles being magnetized in a direction orthogonal to the coil axis and two of the magnetized poles are magnetized in identical and opposing directions to a magnetization direction of the third of the magnetized poles.

19. A linear electromagnetic actuator comprising: a stator energizable by at least one electric coil arranged around an axis of symmetry; multiple stator poles positioned axially on either side of the at least one coil; multiple and antagonistically moveable members of ferromagnetic material; at least three permanently magnetized poles located inside the at least one coil with a first of the magnetized poles positioned in a plane along which is located a length of the axis of symmetry of the at least one coil, and a second and a third of the magnetized poles each arranged laterally on either side of the movable members between the moveable members and the at least one coil; a position sensor located in a housing in a vicinity of the movable members operably indicating a position of at least one of the movable members; the movable members being moveable relative to the poles which are static; and the at least one coil axially extending past opposite axial edges of the magnetized poles.

* * * * *